Oct. 22, 1935.   G. E. HALLENBECK   2,018,553
FEED CONTROL
Filed May 15, 1930   5 Sheets-Sheet 1
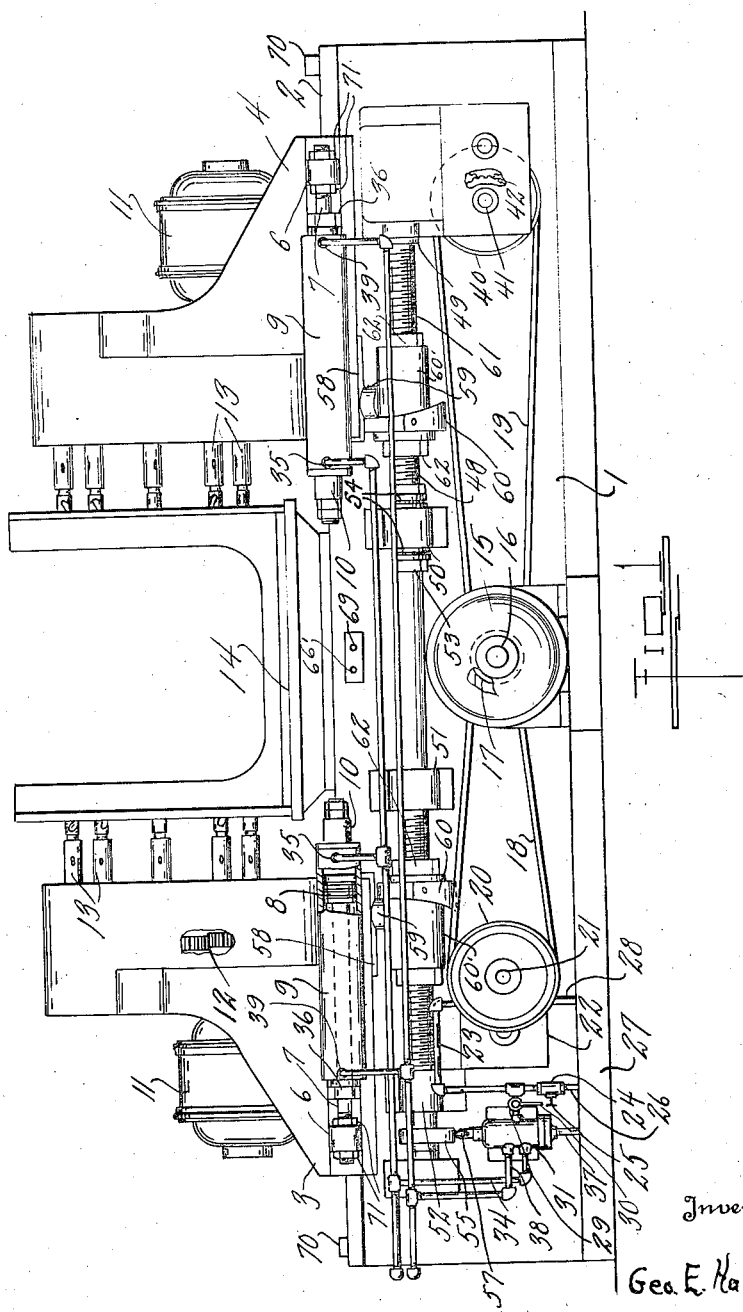
Inventor.
Geo. E. Hallenbeck
By
Geo. E. Kirk
Attorney

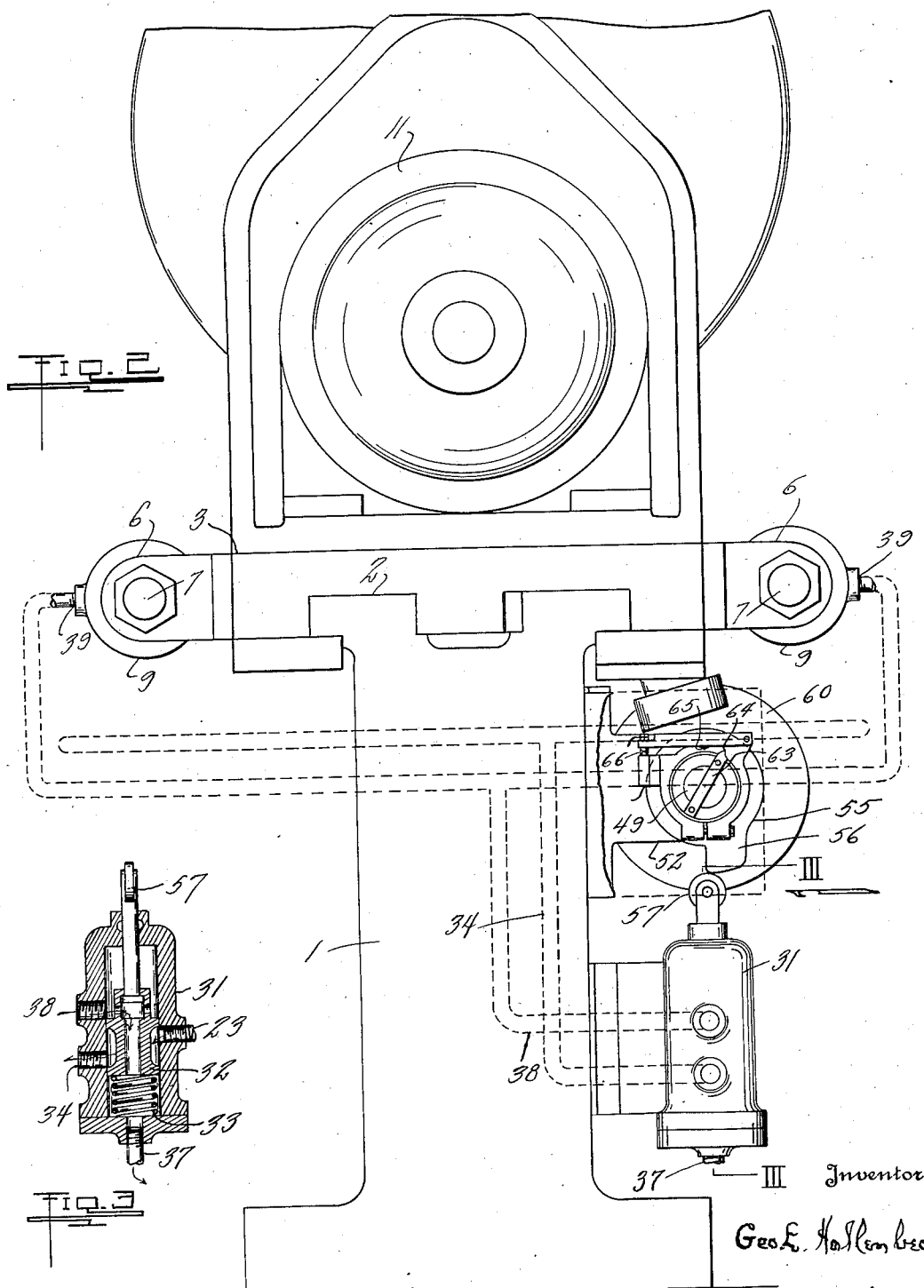

Oct. 22, 1935.   G. E. HALLENBECK   2,018,553
FEED CONTROL
Filed May 15, 1930   5 Sheets-Sheet 3
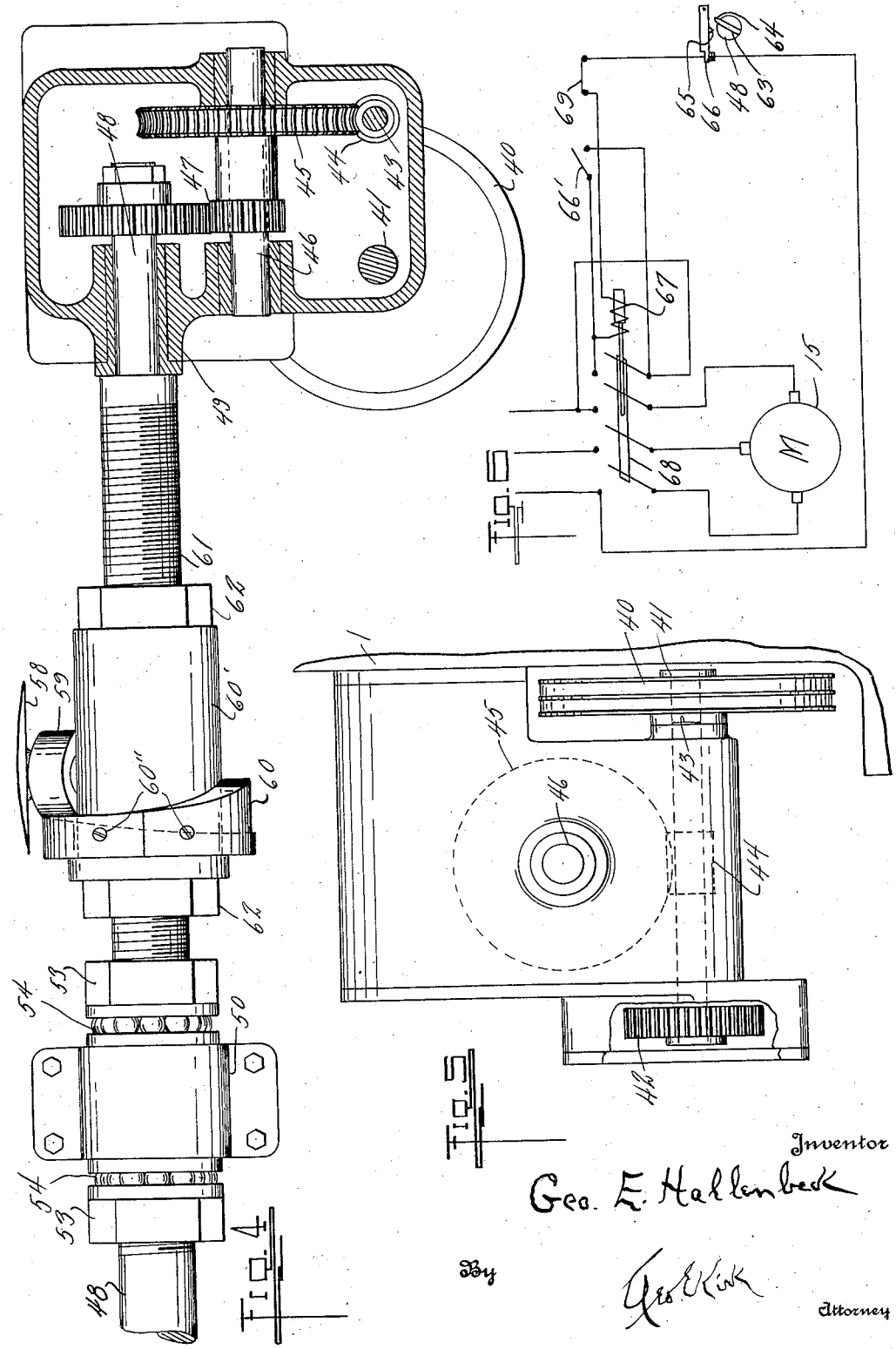
Inventor
Geo. E. Hallenbeck
By
Geo. E. Kirk
Attorney Oct. 22, 1935.   G. E. HALLENBECK   2,018,553
FEED CONTROL
Filed May 15, 1930   5 Sheets-Sheet 4
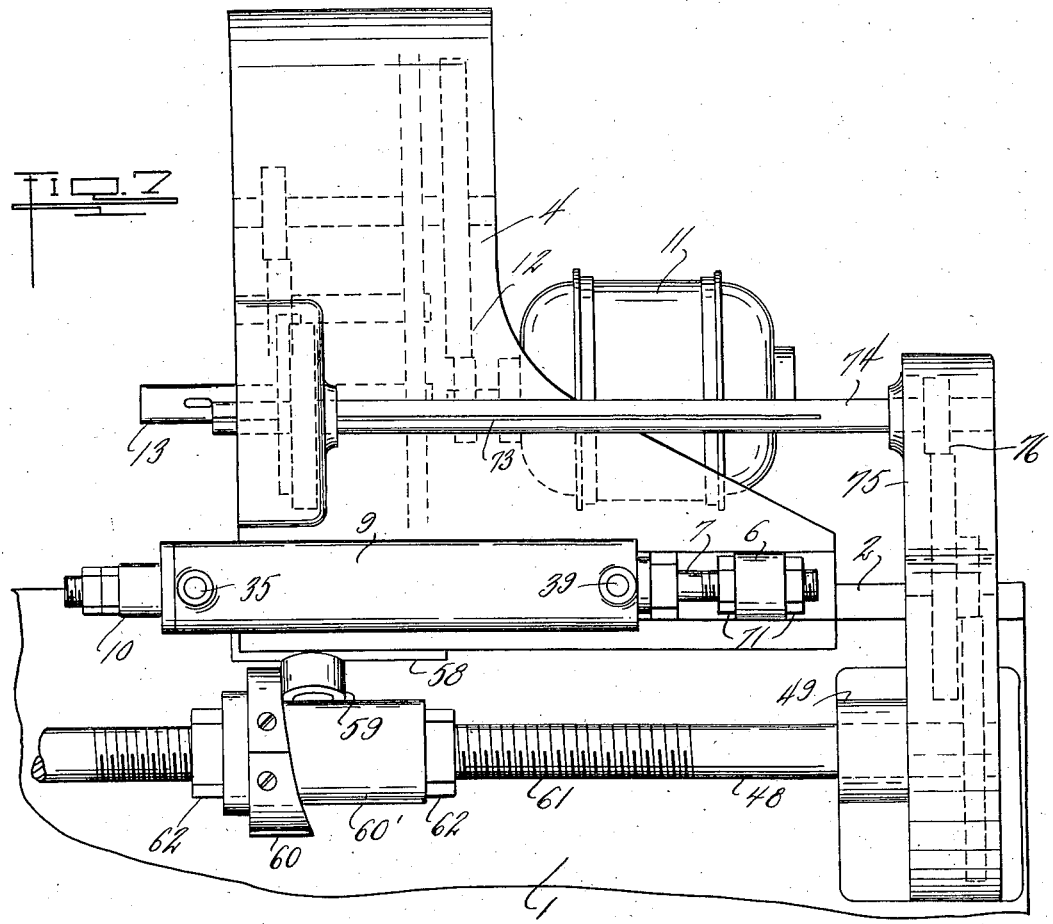
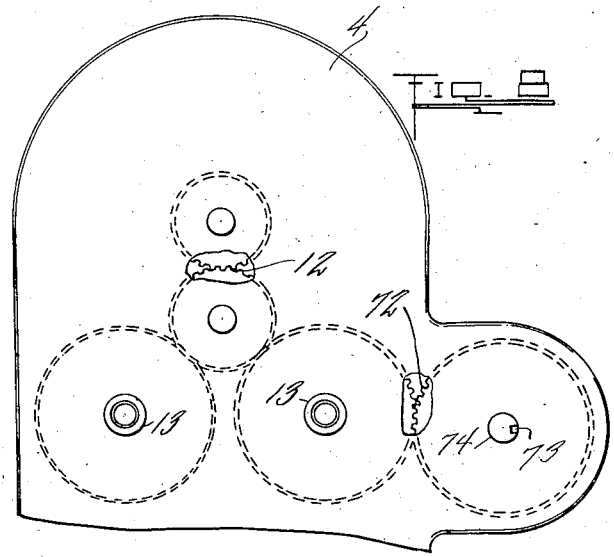
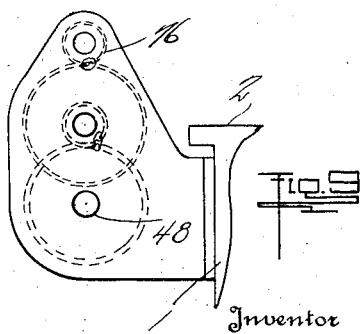
Inventor
Geo. E. Hallenbeck
By
Attorney Oct. 22, 1935.　　　G. E. HALLENBECK　　　2,018,553
FEED CONTROL
Filed May 15, 1930　　　5 Sheets-Sheet 5
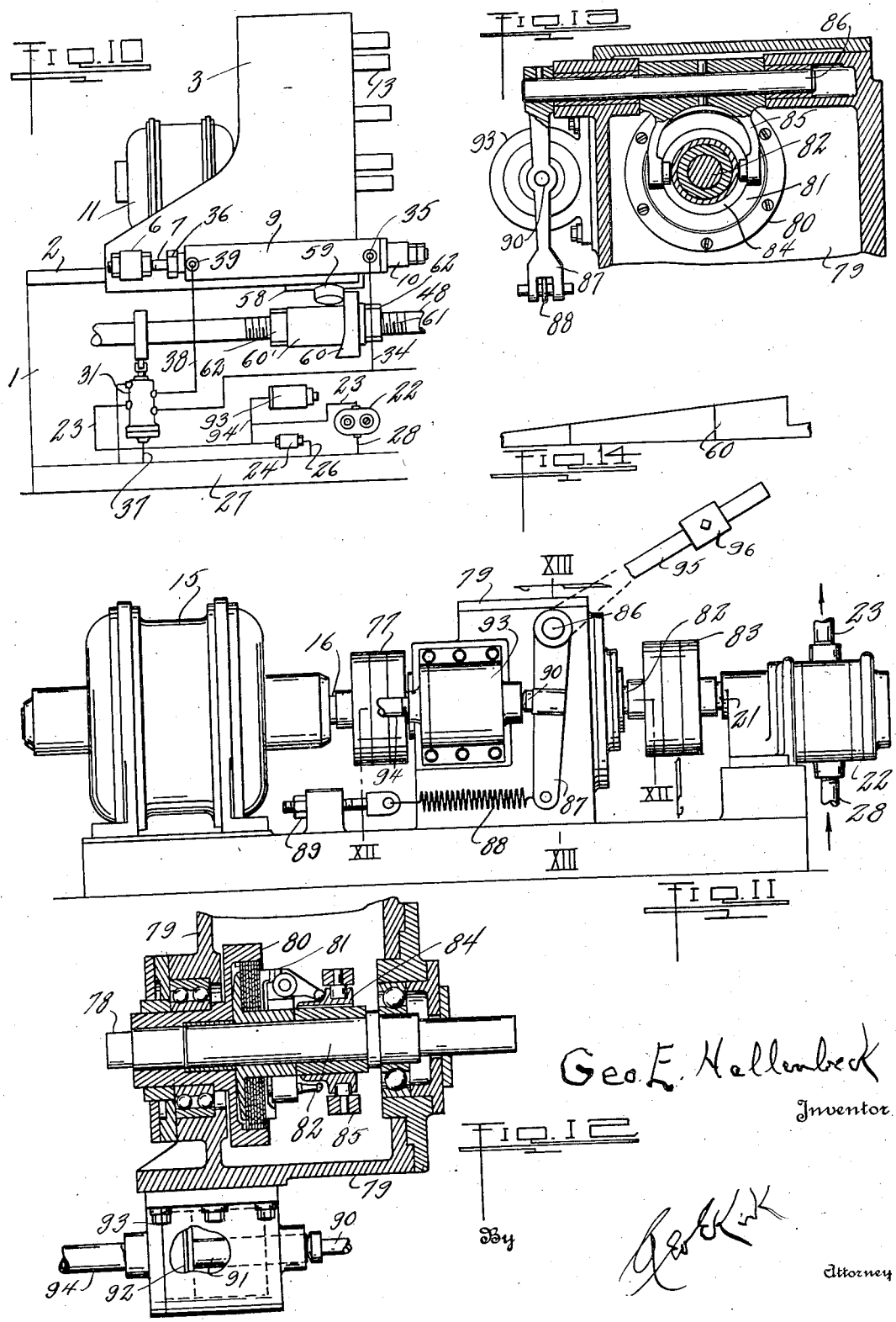

Patented Oct. 22, 1935

2,018,553

UNITED STATES PATENT OFFICE 2,018,553

FEED CONTROL

George E. Hallenbeck, Toledo, Ohio, assignor to Baker Brothers, Inc., Toledo, Ohio, a corporation of Ohio Application May 15, 1930, Serial No. 452,792

18 Claims. (Cl. 77—32)

This invention relates to driving control.

This invention has utility especially in hydraulic transmission, more particularly when in conjunction with features of positive travel control, as in definite escapement for feeding travel during a desired portion of machine tool operation.

Referring to the drawings:

Fig. 1 is a side elevation, with parts broken away, of an embodiment of the invention in a horizontal boring machine;

Fig. 2 is a partial end view of the machine of Fig. 1 from the left;

Fig. 3 is a section on the line III—III, Fig. 2;

Fig. 4 is a detail view on an enlarged scale, with parts in section, of the transmisison connections for effecting the slide or head reciprocation and control;

Fig. 5 is a view of the transmission from the right of Fig. 4, parts being broken away;

Fig. 6 is a wiring diagram of the control;

Fig. 7 is a view of a boring machine head having its holder drive connected to control the escapement or feed rate in retarding the hydraulic transmission;

Fig. 8 is a view of the head of Fig. 7, from the left, parts being broken away;

Fig. 9 is a view of the drive of Fig. 7, from the right, parts being broken away;

Fig. 10 is a fragmentary view of the boring machine with control connections therefrom shown diagrammatically in that type wherein the escapement may be driven by motor on the slide and there is a separate drive for the pump independently of mechanical transmission therefrom to the escapement;

Fig. 11 is a detail view, with parts broken away, showing the separate motor in a combination for pressure throw out for the hydraulic transmission instead of relief valve spill of the hydraulic medium;

Fig. 12 is a partial section on the line XII—XII, Fig. 11;

Fig. 13 is a partial section on the line XIII—XIII, Fig. 11; and

Fig. 14 is a developed view of the cam for the escapement.

Machine tool frame 1 is shown as having guide 2 extending horizontally. Mounted on this guide 2 are heads or slides 3, 4. These slides 3, 4, are provided with brackets 6 connected to piston rods 7 of pistons 8 in cylinders 9 assembled by brackets 10 with the frame 1. As herein disclosed there is a pair of these cylinders for each slide or head, one cylinder being on each side.

The slide or head, as shown, serves as a carrier for motor 11 having transmission connection 12 therefrom to rotating holders 13 for tools to operate upon work on carrier or table 14 therebetween.

Additionally fixed with the frame 1 is motor 15 having shaft 16 carrying pulleys 17 from which extend belts 18, 19, laterally of each other and in opposite directions. The belt 18 extends to pulley 20 on shaft 21 and is effective for driving gear pump 22 for delivering liquid through duct 23. This duct 23 has relief valve 24 with adjusting means 25 for thereby varying the automatic blow-off or discharge pressure. This is an excess pressure operated means for the device. From this automatic blow-off or relief valve 24 there is line 26 to sump or reservoir 27 from which the pump 22 withdraws the liquid by duct 28. Additionally, the line 23 is provided with emergency valve 29 which, as closed by operating handle 30, causes the pressure generated by the pump 22 to open relief valve 24 and thus allows the fluid as oil to pass by way of line 26 to the sump 27.

The line 23 has connection to housing 31 of a reversing valve wherein is disposed plunger 32 normally elevated by compression spring 33. With the plunger depressed, the fluid pressure from the pump 22 by the line 23 as delivered to the chamber or housing 31, may be controlled by the plunger 32 to flow by line 34 and its branches to entrance ports 35 of the respective cylinders 9 of the piston and cylinder devices. This power fluid delivered to the inner side of the pistons 8 causes the piston rods 9 to be thrust outward from glands 36 of the cylinders 9 so that the brackets 6 shift the slides 3, 4, outwardly.

At the upper position of the plunger 32, the lines 34 are connected through the housing 31 with line 37 for exhausting from the inner ends of the cylinders 9 into the sump 27, while the pressure fluid from the line 23 passes the plunger 32 for delivery by line 38 and its branches to ports 39 adjacent the glands 36 in the respective cylinders 9, thereby actuating the pistons 8, for travel into the cylinders toward the ports 35 and thus pull the slides 3, 4, along the guide 2 to have the slides move toward each other.

In the reverse travel, when the plunger 32 is down and the pressure from the line 23 passes into the line 34, the line 38 exhausts through the hollow plunger 32 and the duct 37 into the sump 27.

From the common normally continuously operable motor 15, the belt or sprocket chain 19 passes about pulley 40 on shaft 41 having changeable gear connection 42 to shaft 43 effective through worm 44 for driving worm wheel 45 on shaft 46 with additional step-down gear connection 47 to drive shaft 48, mounted in bearings 49, 50, 51, 52, along the side of the frame 1.

On the inner side adjacent one of the bearings 50, (Figs. 1, 4) collars 53 are spaced from such bearing by anti-friction bearings 54 thereby taking up longitudinal thrust in the shaft 48. Adjacent the bearing 52, the shaft 48 has fixed therewith cam 55 effective as to its nose 56 for acting on roller 57 carried by the plunger 32 in thereby depressing such plunger for effecting the valve reversal for quick recovery of the slides with the relatively longer interval for the slides to move in the feeding direction or away from the ends of the frame 1 (Figs. 1, 2).

Between the slide and frame escapement is provided by interengaging abutments, one being movable. As herein disclosed the movable abutment is mounted on the frame. To this end each of the slides is provided with bracket 58 mounting roller 59 located for coacting with cam 60 detachably mounted on sleeve 60' by means of screws 60'' for ready different cam form substitution. Furthermore, the sleeve 60' is adjustable along threaded region 61 of the shaft 48, thus additionally to vary the control range. The longitudinal position of this cam 60 on the shaft 48 is determined by nuts 62 on opposite sides of the sleeve 60', these nuts engaging the threaded portion 61 of the shaft 48. The retraction of the slides or movement toward the outer ends of the frame 1, is, as herein disclosed, the idle stroke and uninterrupted insofar as the hydraulic transmission or actuation.

Upon the reversal of the mechanism becoming effective for the piston and cylinder device to operate in the opposite or feeding direction of the cycle, the slide travel may be rapid until there is interengagement between the abutments 59, 60. This brings about a positive stop when the shaft 48 does not rotate. However, this shaft 48 may be driven continuously or for a cycle of operations and accordingly the cam 60 is rotated for the feed operation and has the location of its control face against the roller 59, which face recedes toward the center of the frame or in the direction of the feed travel for the slide 3.

The pitch of the cam may be determined for the feed rate, either as continuous or variable, in the latter instance, say for determining a tool finish at a shoulder or the bottom of an opening, by slowing up the feed rate at such point. Furthermore, the speed of permitted feed may be determined by the change speed gearing 42. Accordingly, niceties of the rate of feeding or progress between the tool and the work are definitely determined with the hydraulic transmission as the propulsion power, or actuator, and with this escapement device as the control for the actuator effectiveness.

In practice, besides the fixed speed for the rate of the cam rotation, and the adjustment of the cam longitudinally of the shaft for the location of this feed control position, there may be substituted desired different configuration of cams.

As herein disclosed, the common motor 15 effects driving of both the escapement as well as the pump supplying the pressure for the hydraulic transmission. With the continuous operation of such motor and with the retarding of the progress of the feed rate of the piston and cylinder device, there is reaction directly on the pressure in the line 23, and the automatic relief valve 24 is thus effective for spilling the surplus oil into sump 27, the peak pressure holding the slides firmly at the control feed rate of the abutments in the cooperating or interengaging relation.

The continuous operation for a plurality of cycles is effected by the cam 55, 56, except as the emergency valve 29 may be manually operated to cut out the power line 23 from communicating with the housing 31 (Figs. 1, 2).

In some operations it may be desirable to have the machine operate only in a cycle for one complete reciprocation. To such end there may be located on the shaft 48, adjacent the cam 55, 56, trip bar 63 for having its nose 64 act on pivot bar 65 and thus open switch 66 as a circuit breaker, for stopping the motor 15.

To start the machine, the operator may close manual switch 66' and hold such switch depressed for the period of time to have the nose or point 64 clear the bar 65 for the switch 66 to close. This depression of the switch 66' is effective through coil 67 for operating switch 68 toward closing position in starting the motor 15.

In lieu of, or in addition to the hydraulic emergency valve 29, there may be normally closed switch 69 located in a convenient position for the operator of the machine so that depressing of this switch will act the same as the breaking of the circuit at the bar 65 and thus stop the motor 15. This mode of stopping the motor 15 has effectiveness beyond that of the emergency valve 29 in that the shaft 48 is also stopped and the relative sequence or relation of the control and the valve mechanism is maintained at the stop position.

The limit of outward or idle travel for the heads 3, 4, may be determined by bumpers or abutment blocks 70 adjusted at the desired stroke limit. Furthermore, the travel outward may be limited by the piston at the cylinder, with the adjustment of the connection between the piston rod 7 and the bracket 6 determined by the location of the nuts 71, or there may be length of dwell on the cam 60.

Instead of the lay shaft 48 being driven from the motor 15 operating the pump 22, advantages may come in maintaining a ratio for this lay shaft 48 as to the operation of the holders 13. To this end the drive for the holders 13 is advantageously one from which the lay shaft 48 is actuable. In the instance herein shown, with the holders 13 driven by motor 11 on the heads, connection from the gear train 12 may be effected through gear 72 having spline connection 73 with shaft 74 carried by housing 75 fixed with the frame 1. From this shaft 74 is gear train 76 as a speed reduction to drive the shaft 48 (Figs. 7, 8, 9) in lieu of the gearing 47.

For automatic control the wiring diagram for the motor 15 can be adopted for that of the motor 11 when the motor 11 operates the lay shaft. In this instance of the escapement travel from the motor 11 on a head and the motor 15 operating only the pump, advantage arises in instances that the pump 22 be not operated continuously for the pressure escape of the hydraulic medium through the relief valve as such may build up temperature to reduce viscosity, introduce hazard of ignition and deteriorate such medium.

To avoid this difficulty, shaft 16 from the motor may be provided with self-aligning coupling 77 (Figs. 11, 12) to shaft portion 78 extending into housing 79 and there provided with clutch member 80 to be connected with clutch member 81 fast with shaft section 82, extending through sleeve aligning coupling 83 to shaft 21 for the pump 22. The clutch 80, 81, is operable by slidable collar 84 as controlled by fork 85 depending from rock shaft 86. This rock shaft 86 mounted in the frame 79 has depending arm 87 connected to tension helical spring 88 adjusted as to its tension by nut 89. This arm 87 is provided with abutment 90 disposed in approximate alignment with piston rod 91 from piston 92 in cylinder 93.

Line 23 from the pump 22 is shown as having line 94 extending to this cylinder 93 and thus effective as the pressure builds up, due to resistance in the operation of the machine and exceeding the adjustment determined by the spring 88 and nut 89, to extend the spring 88 and thereby rock the shaft 86 and through the operation of the fork 85 throw the clutch collar 84 into position for opening the clutch 80, 81, so that the motor 15 will run idly and not operate the pump 22. This cut-out is effective until the pressure in the hydraulic system lowers when the spring 88 is at once effective for resetting the clutch and there is automatic cutting in the motor 15 for continuation of the hydraulic system operation under the maintained pressure.

In conjunction with or in lieu of the adjusting spring 88 the rock shaft 86 may have arm 95 with adjustable counter-weight 96 thereon as the control for determining the holding action of the arm 87 as to the piston rod 91. It is accordingly seen in carrying out the invention by this hydraulically released clutch there is an excess pressure control means responsive to the building up of pressure in the hydraulic system and automatically cutting in as well as cutting out.

What is claimed and it is desired to secure by Letters Patent is:

1. A machine frame providing a guide, a slide mounted on the guide, a rotary holder mounted on the slide, a first drive for rotating the holder, an actuator for reciprocating the slide axially of the rotary holder along the guide including a piston and cylinder device between the frame and slide, a fluid pressure supply, a slide control cycle-determining valve means for the supply to the device to actuate the slide along the guide, a variable speed escapement providing a control for the actuator, and a second drive for the valve means and escapement independent of the drive for the holder.

2. A machine frame providing a guide, a slide mounted on the guide, a rotary holder mounted on the slide, a first drive for rotating the holder, an actuator for reciprocating the slide axially of the rotary holder along the guide including a piston and cylinder device between the frame and slide, a fluid pressure supply, a slide control cycle-determining valve means for the supply to the device, a retarder for the actuator, a second drive for the valve means independent of the first drive for rotating the holder, and variable speed gearing from the second drive for controlling movement for the retarder relatively to the slide and guide.

3. A machine frame providing a guide, a slide mounted on the guide, a rotary holder on the guide, an opposing holder, one of said holders being for work and the other for a tool, an actuator for reciprocating the slide axially of the rotary holder along the guide to cause said holders to approach, said actuator including a piston and cylinder device outward from the plane of the guide toward the slide, a second drive independent of the drive for rotating the holder, and actuator-opposing variable-rate means operable relatively to the slide by the second drive.

4. A machine frame providing a guide, a slide mounted on the guide, said slide having a plane toward the guide, a rotary holder mounted on the slide, a first drive for rotating the holder, an actuator for reciprocating the slide axially of the rotary holder along the guide including a pair of parallel piston and cylinder devices outward from the plane of the guide toward the slide and approximately in said plane, and a second drive independent of the drive for rotating the holder, said second drive having control means for synchronizing the devices in direction and rate of actuator operation.

5. A machine frame providing a guide, a slide mounted on the guide, a rotary holder, a first drive for rotating the holder, an actuator for reciprocating the slide axially of the rotary holder along the guide including a piston and cylinder device between the frame and slide outward from the plane of the guide from the slide, reciprocation-determining mechanism for the device, a movable mechanical positive-retarder variable-rate control for the device, a second drive for the mechanism in effecting reciprocation of the rotary holder, and connections from the second drive to operate the retarder for movement relatively to the slide.

6. A machine frame providing a guide, a slide mounted on the guide, a rotary holder mounted on the slide, a first drive for rotating the holder, an actuator for reciprocating the slide axially of the rotary holder along the guide including a piston and cylinder device between the frame and slide, reversing valve mechanism for the device, a second drive for the mechanism for determining and effecting different direction operation sequence of the device, and slide movement modifying means coacting between the frame and slide embodying a movable member actuable by the second drive relatively to the slide.

7. A machine tool frame providing a guide, a rotary holder carrying slide mounted on the guide for reciprocation axially of the holder rotation, a first drive for rotating the holder, a piston and cylinder device extending parallel to the guide, a shaft parallel to the guide, a cam on the shaft providing a variable control for the slide, an abutment carried by the slide for determining slide progress for an interval of coaction of the abutment with the cam, and a second drive for shifting the cam relatively to the abutment in locating the cam as an escapement in slowing up device operation of the slide.

8. A machine tool frame providing a guide, a rotary holder carrying slide mounted on the guide for reciprocation axially of the holder rotation, a first drive for rotating the holder, a piston and cylinder device extending parallel to the guide, a shaft parallel to the guide, a cam on the shaft providing a variable control for the slide, an abutment carried by the slide for determining slide progress for an interval of coaction of the abutment with the cam, a second drive for shifting the cam relatively to the abutment in locating the cam as an escapement in slowing up device operation of the slide, and excess pressure operated control means for the device.

9. A horizontal boring machine comprising a frame, a guide, opposing heads slidably mounted on the guide, independent rotary driving means for the respective heads, reciprocation effecting means axially of the direction of the rotation of said heads embodying piston and cylinder devices, a pair for each head, reversing valve mechanism common for the several devices, a second drive independent of the rotary driving means for the heads, said second drive operating the mechanism in effecting complete cycles of operations, and automatic control means from the machine for modifying the action of the second drive.

10. A horizontal boring machine comprising a frame, a guide, opposing holder slidably mounted on the guide, rotary driving means for one of said holders, reciprocation effecting means axially of said rotary holder embodying piston and cylinder devices, reversing valve mechanism common for the several devices, a second drive for operating the mechanism independent of said rotary driving means, an automatic cut-out for the drive operable from the machine, a feed rate check for the holder including positively interposed resistance means, a connection from the second drive for shifting the means in determining rotation feed rate for the device operation of the holder, and adjustable pressure control means set to be automatically operable for the device as the resistance means is effective.

11. A machine tool embodying a frame providing a guide, a slide mounted on the guide, a rotary holder on the slide, a first drive for rotating the holder, a hydraulic actuator for propelling the slide along the guide axially of the holder rotation, a direct control for the slide embodying interengaging abutment means between the slide and frame, a second drive for the abutment means, direction control connection from the second drive for the actuator, and a maximum pressure responsive cut-out for the actuator, said cut-out having cut-in-means automatically effective at pressure drop.

12. A machine tool embodying a frame providing a guide, a slide reciprocable on the guide, a rotary holder on the slide, a hydraulic actuator for propelling the slide along the guide in one direction axially of the holder rotation, a direct control for the slide embodying interengaging abutment means between the slide and frame, said actuator including pressure building up means, an excess pressure responsive device connected thereto, and means for resetting said device at pressure drop.

13. A machine frame providing a guide, a slide mounted on the guide, a rotary holder carried by the slide, a first drive for rotating the holder, pressure fluid operated means for reciprocating said slide axially of said holder rotation, a movable cam supported on said frame, means movable with said slide arranged automatically to engage said cam and influence the speed of movement imparted to said slide by the pressure fluid operated means during a portion of the forward stroke thereof, and a second drive for rotating said cam in controlling said reciprocating independently of said holder rotation.

14. A machine frame providing a guide, a slide reciprocable on the guide, a rotary holder mounted on the slide, first drive means for rotating said holder, hydraulic means for reciprocating the slide axially of the holder rotation, a receding abutment for the slide effective only when the latter is moving its holder in a feeding direction to limit the movement imparted to the slide by said hydraulic means to a cutting speed, additional driving means for rotating the abutment independently of the rotation of the holder, means operable upon the reversal of said hydraulic means at the end of the movement of the slide in said feeding direction to render said abutment ineffective to limit the return speed of said slide, and a second drive for effecting said reversal and positioning said abutment.

15. A machine frame providing a guide, a slide thereon, a rotary holder mounted on the slide, driving means for rotating said holder, a cam for reciprocating said slide, a fluid pressure actuator for effecting said reciprocation, a reversing valve therefor, a cam for actuating said reversing valve, a common rotary driving shaft for said cams, and a second drive for rotating said shaft independently of said rotary holder.

16. A machine frame providing a guide, a slide reciprocable thereon, a rotary holder mounted on the slide, first drive means to rotate the holder, fluid pressure actuated feed means for causing reciprocation of said slide axially of said rotation, a control valve controlling direction of flow of fluid to the feed means and relatively to which valve the reciprocated slide is movable, cam means, second drive means for the cam means to control driving cycles of the reciprocable slide, rotary shaft means mounting the cam means, bearing means supporting the cam shaft means for rotation, and a fixed mounting for the valve and bearing means on the frame whereby the effective actuation of the reciprocable slide from the flow of fluid through the pressure actuated feed means is determined by the cam means rotation relatively to the fixed mounting.

17. A machine frame providing a guide, a movable slide thereon, a rotary holder mounted by the slide, first drive means for rotating said holder, a cylinder and piston mechanism for reciprocating the slide with the holder thereon, means for supplying operating fluid under pressure to said mechanism to cause reciprocation between the piston and cylinder axially of the rotary slide, means for controlling the operating fluid for controlling the direction of operation of said mechanism, and second drive means independent of the first drive means effective further to control operation of the reciprocable slide.

18. A machine frame providing a guide, a relatively reciprocable slide thereon, a holder on the slide, first drive means for rotating the holder, cylinder and piston means for reciprocating the holder axially of said rotation, the cylinder of said means being fixed with the guide, means for supplying operating fluid under pressure to the cylinder to cause reciprocation of the slide, a valve for controlling the direction of flow of the operating fluid under pressure to the cylinder, and second drive means influencing the rate of movement of said slide and position said valve.

GEORGE E. HALLENBECK.

CERTIFICATE OF CORRECTION.

Patent No. 2,018,553.                                               October 22, 1935.

GEORGE E. HALLENBECK.

It is hereby certified that error appears in the printed specification of the above numbered patent requiring correction as follows: Page 3, first column, line 69, claim 3, before "an" insert the words and comma a first drive for rotating the holder,; page 4, first column, line 17, claim 10, before "drive" insert the word second; and that the said Letters Patent should be read with these corrections therein that the same may conform to the record of the case in the Patent Office.

Signed and sealed this 26th day of November, A. D. 1935.

Leslie Frazer (Seal)                                       Acting Commissioner of Patents.